US012576857B2

(12) United States Patent
Rydström et al.

(10) Patent No.: US 12,576,857 B2
(45) Date of Patent: Mar. 17, 2026

(54) ROBUST VEHICLE SPEED OVER GROUND ESTIMATION USING WHEEL SPEED SENSORS AND INERTIAL MEASUREMENT UNITS

(71) Applicant: VOLVO TRUCK CORPORATION, Gothenburg (SE)

(72) Inventors: Mats Rydström, Billdal (SE); Mats Jonasson, Partille (SE); Leon Henderson, Härryda (SE); Adithya Arikere, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 25 days.

(21) Appl. No.: 18/845,827

(22) PCT Filed: Jun. 3, 2022

(86) PCT No.: PCT/EP2022/065278
§ 371 (c)(1),
(2) Date: Sep. 10, 2024

(87) PCT Pub. No.: WO2023/169701
PCT Pub. Date: Sep. 14, 2023

(65) Prior Publication Data
US 2025/0178614 A1      Jun. 5, 2025

(30) Foreign Application Priority Data

Mar. 10, 2022   (WO) ................. PCT/EP2022/056181
Jun. 2, 2022   (WO) ................. PCT/EP2022/065082

(51) Int. Cl.
B60W 40/00        (2006.01)
B60T 8/17        (2006.01)
(Continued)

(52) U.S. Cl.
CPC ......... B60W 40/105 (2013.01); B60T 8/1708 (2013.01); B60T 8/172 (2013.01);
(Continued)

(58) Field of Classification Search
CPC ............... B60W 40/105; B60W 30/02; B60W 2520/105; B60W 2520/28;
(Continued)

(56) References Cited

U.S. PATENT DOCUMENTS 5,173,860 A * 12/1992 Walenty ................... B60T 8/172
                                                              701/75
5,579,230 A * 11/1996 Lin ......................... B60T 8/172
                                                              180/197
(Continued)

FOREIGN PATENT DOCUMENTS

CN         201486706 U     5/2010
EP          3851346 A1     7/2021
(Continued)

OTHER PUBLICATIONS

International Search Report and Written Opinion of the International Searching Authority in corresponding International Application No. PCT/EP2022/067839 mailed Dec. 2, 2022 (8 pages).
(Continued)

*Primary Examiner* — Phutthiwat Wongwian
*Assistant Examiner* — Sherman D Manley
(74) *Attorney, Agent, or Firm* — Jeffri A. Kaminski; Venable LLP

(57)            ABSTRACT
A vehicle motion management, VMM, system for a heavy-duty vehicle has at least one wheel speed sensor outputs a wheel speed signal indicative of a rotation speed of a respective wheel on the vehicle, at least one inertial measurement unit, IMU, outputs an IMU signal indicative of an acceleration of the vehicle, a motion estimation function
(Continued)

estimates a vehicle motion state comprising vehicle speed over ground, SOG, based on the at least one wheel speed signal and on the at least one IMU signal. The motion estimation function estimates a respective SOG error associated with the wheel speed signal as an increasing function of an applied torque to the wheel, and a respective SOG error associated with the IMU signal as an increasing function of a time duration elapsed after calibration of an integrator of the IMU signal. The motion estimation function estimates the vehicle SOG, based on a weighted combination of the at least one wheel speed signal and the at least one IMU signal, where the weights of the weighted combination are determined based on the SOG error associated with the wheel speed signal and on the SOG error associated with the IMU signal.

15 Claims, 5 Drawing Sheets

(51) Int. Cl.
 *B60T 8/172*  (2006.01)
 *B60T 8/32*  (2006.01)
 *B60W 30/02*  (2012.01)
 *B60W 40/105*  (2012.01)

(52) U.S. Cl.
 CPC .............. *B60T 8/32* (2013.01); *B60W 30/02* (2013.01); *B60T 2250/04* (2013.01); *B60W 2520/105* (2013.01); *B60W 2520/28* (2013.01); *B60W 2720/30* (2013.01)

(58) Field of Classification Search
 CPC .. B60W 2720/30; B60T 8/1708; B60T 8/171; B60T 8/172; B60T 8/32; B60T 2250/04; B60Y 2400/81
 See application file for complete search history.

(56)      References Cited

U.S. PATENT DOCUMENTS

| | | | | |
|---|---|---|---|---|
| 6,194,850 | B1 * | 2/2001 | Kumar | .................. B60T 8/1705 |
| | | | | 318/587 |
| 6,758,087 | B2 * | 7/2004 | Balch | ........................ G01P 3/56 |
| | | | | 73/488 |
| 2004/0138802 | A1 | 7/2004 | Kuragaki et al. | |
| 2005/0038588 | A1 | 2/2005 | Shukla | |
| 2011/0118935 | A1 * | 5/2011 | Shiozawa | ........... B60W 40/068 |
| | | | | 701/33.4 |
| 2015/0127237 | A1 | 5/2015 | Blyth et al. | |
| 2015/0291178 | A1 | 10/2015 | You et al. | |
| 2016/0368503 | A1 | 12/2016 | Jonasson et al. | |
| 2018/0178767 | A1 | 6/2018 | Chanda | |
| 2018/0273045 | A1 | 9/2018 | Herrera et al. | |
| 2020/0191938 | A1 | 6/2020 | Green et al. | |
| 2025/0178575 | A1 * | 6/2025 | Rydström | ............. B60T 8/1708 |

FOREIGN PATENT DOCUMENTS

| | | | |
|---|---|---|---|
| GB | 472452 | A | 9/1937 |
| JP | H06159175 | A | 6/1994 |
| JP | 2006327242 | A | 12/2006 |
| WO | 2017215751 | A1 | 12/2017 |
| WO | 2021144009 | A1 | 7/2021 |
| WO | 2021144010 | A1 | 7/2021 |
| WO | 2021144065 | A1 | 7/2021 |

OTHER PUBLICATIONS

International Search Report and Written Opinion of the International Searching Authority in corresponding International Application No. PCT/EP2022/065278 mailed Nov. 22, 2022 (10 pages).

International Preliminary Report on Patentability Chapter II in corresponding International Application No. PCT/EP2022/065278 dated Oct. 5, 2023 (6 pages).

International Search Report and Written Opinion of the International Searching Authority in corresponding International Application No. PCT/EP2022/065082 mailed Nov. 7, 2022 (9 pages).

International Preliminary Report on Patentability Chapter II in corresponding International Application No. PCT/EP2022/065082 dated Sep. 28, 2023 (6 pages).

International Search Report and Written Opinion of the International Searching Authority in corresponding International Application No. PCT/EP2022/056181 mailed Oct. 7, 2022 (10 pages).

International Preliminary Report on Patentability Chapter II in corresponding International Application No. PCT/EP2022/056181 dated Oct. 5, 2023 (5 pages).

Gillespie, Thomas D.; "Fundamentals of Vehicle Dynamics"; Warrendale, PA: Society of Automotive Engineers(1992); ISBN 978-0-7680-2333-6; 24 pages.

Hans B. Pacejka; "Tyre and Vehicle Dynamics" (Third Edition); published Butterworth-Heinemann, 2012; ISBN 978-0-08-097016-5; https://doi.org/10.1016/B978-0-08-097016-5.00007-3; 621 pages.

Sandeep Rao; "Introduction to mmwave Sensing: FMCW Radars"; Texas Instruments; 2017; 70 pages.

\* cited by examiner

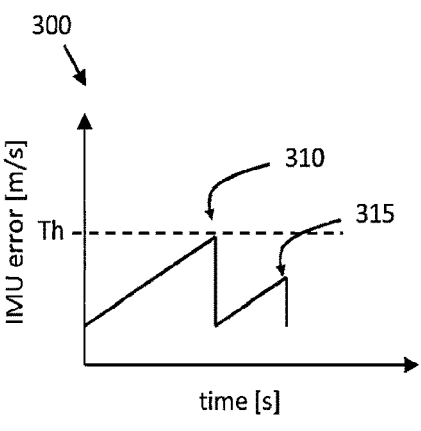
FIG. 3A
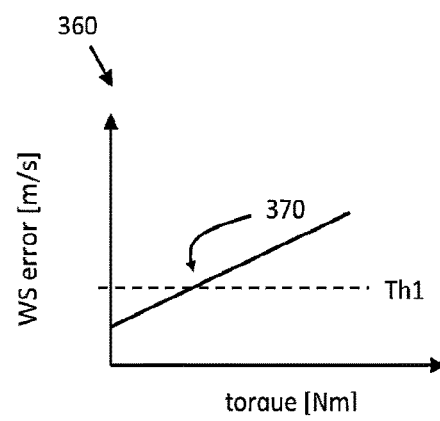
FIG. 3B
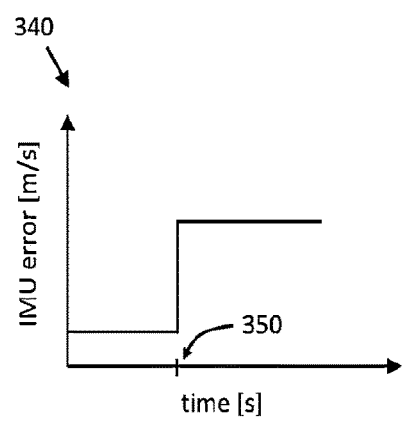
FIG. 3C
FIG. 3D
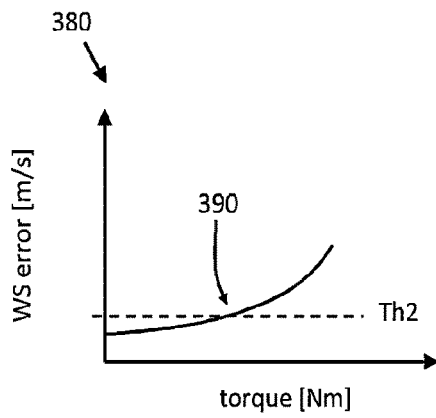
FIG. 3E

500

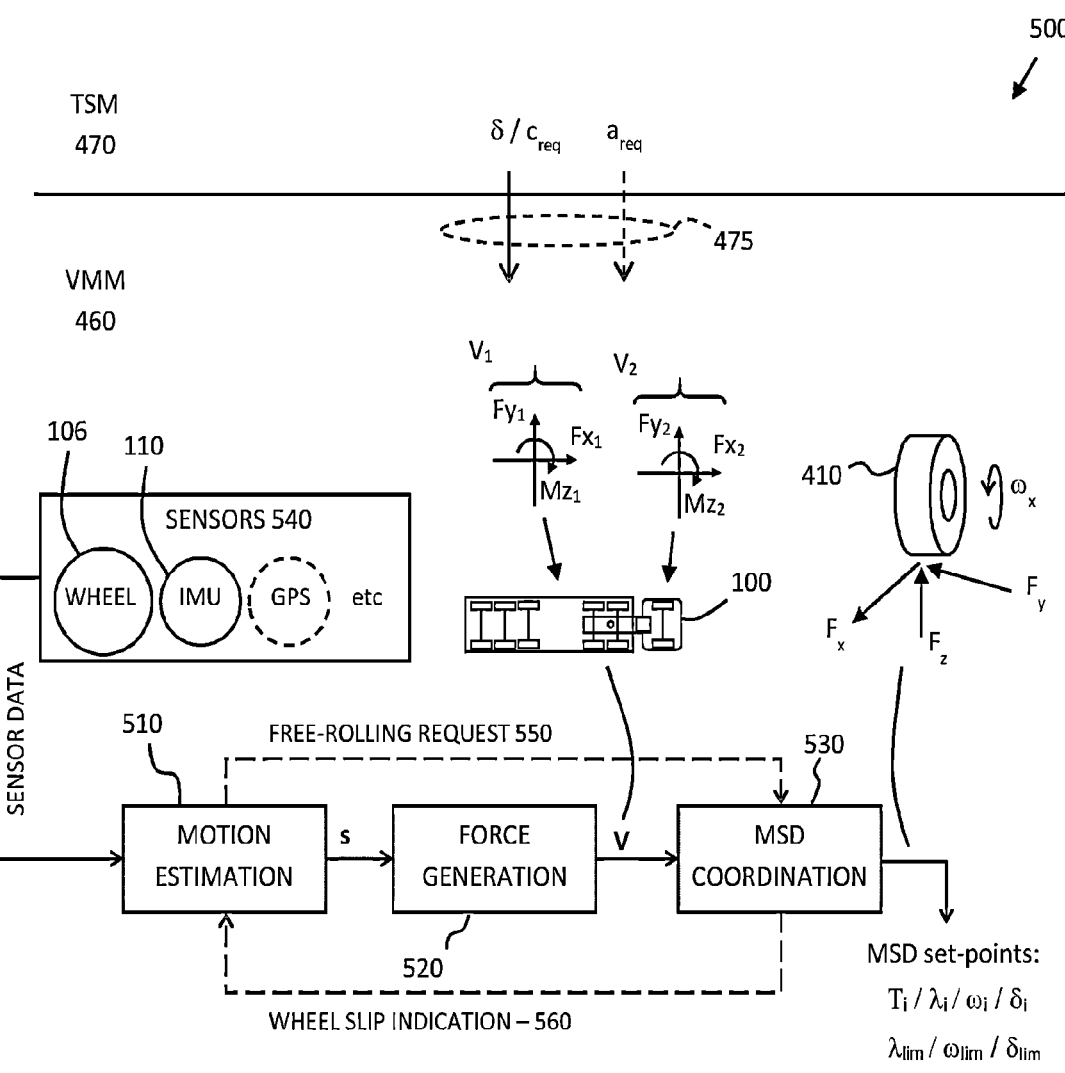

TSM
470

$\delta / c_{req}$       $a_{req}$

475

VMM
460

$V_1$       $V_2$ $Fy_1$   $Fx_1$   $Fy_2$   $Fx_2$
$Mz_1$   $Mz_2$

410   $\omega_x$ 106   110

SENSORS 540

WHEEL   IMU   GPS   etc

100

$F_y$
$F_x$   $F_z$

SENSOR DATA

510

FREE-ROLLING REQUEST 550

530

MOTION ESTIMATION   s   FORCE GENERATION   V   MSD COORDINATION

520

WHEEL SLIP INDICATION – 560

MSD set-points:
$T_i / \lambda_i / \omega_i / \delta_i$
$\lambda_{lim} / \omega_{lim} / \delta_{lim}$

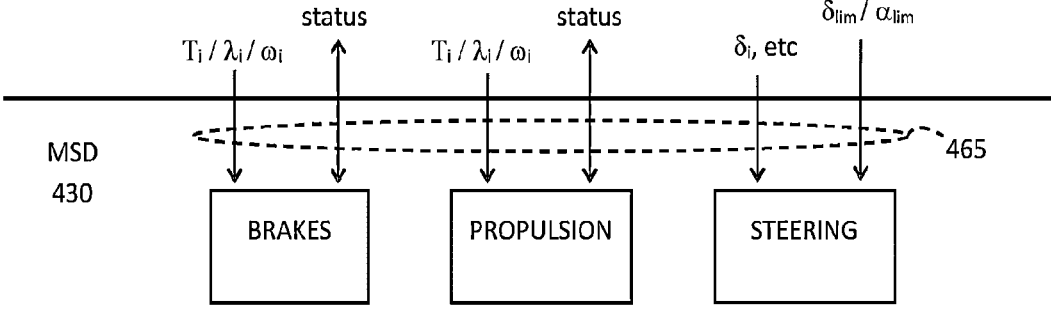

status   status   $\delta_{lim} / \alpha_{lim}$ $T_i / \lambda_i / \omega_i$   $T_i / \lambda_i / \omega_i$   $\delta_i$, etc

MSD
430

465

BRAKES   PROPULSION   STEERING

FIG. 5

ROBUST VEHICLE SPEED OVER GROUND ESTIMATION USING WHEEL SPEED SENSORS AND INERTIAL MEASUREMENT UNITS

CROSS-REFERENCE TO RELATED APPLICATIONS

This application is a U.S. National Stage application of PCT/EP2022/065278, Jun. 3, 2022 and published on Sep. 14, 2023 as WO 2023/169701, which claims the benefit of International Patent Application Nos. PCT/EP2022/056181, filed Mar. 10, 2022, and PCT/EP2022/065082, filed Jun. 2, 2022, all of which are hereby incorporated by reference in their entireties.

TECHNICAL FIELD

The present disclosure relates to methods and control units for robust heavy-duty vehicle motion estimation. The methods are particularly suitable for use with cargo transporting vehicles, such as trucks and semi-trailers. The invention can however also be applied in other types of heavy-duty vehicles, e.g., in construction equipment and in mining vehicles, as well as in cars.

BACKGROUND

Heavy-duty vehicles have traditionally been controlled using torque request signals generated based on the position of an accelerator pedal or brake pedal and sent to motion support devices (MSDs) such as service brakes and propulsion devices over a controller area network (CAN) bus. However, advantages may be obtained by instead controlling the actuators using wheel slip or wheel speed requests sent from a central vehicle controller to the different actuators. This moves the actuator control closer to the wheel end, and therefore allows for a reduced latency and a faster more accurate control of the MSDs. Wheel-slip based MSD control approaches are particularly suitable for use with wheel-end electrical machines in a battery or fuel cell powered heavy-duty vehicle, where motor axle speeds can be accurately controlled with low control latency and at high bandwidth. Wheel-slip based vehicle motion management (VMM) and its associated advantages are discussed, e.g., in WO 2017/215751 A1 and also in WO 2021/144010 A1.

Wheel slip based control of heavy-duty vehicles rely on accurate knowledge of the vehicle speed over ground (SOG) and on the rotation speed of the wheel, since these two quantities together determine the wheel slip. The rotation speed of the wheel can be reliably obtained from sensors such as Hall effect sensors or rotary encoders. However, the vehicle SOG may be more difficult to obtain robustly and in a cost efficient manner, at least in some of the more challenging environments and operating conditions of the heavy-duty vehicle, such as low friction operating conditions, split friction operating conditions, and during maneuvering involving large wheel forces.

An inertial measurement unit (IMU) provides data on acceleration and rotation, which can be integrated in order to obtain information about the vehicle SOG.

US 2005/0038588 A1 discusses vehicle motion estimation using various sensors, including wheel speed sensors and IMUs.

US 2018/0178767 A1 also discusses vehicle speed determination based on a combination of IMU and wheel speed sensors.

US 2015/0291178 A1 describes a system for estimating vehicle velocity which is based on an IMU in combination with wheel speed sensors and a steering angle sensor.

EP 3851346 A1 discloses devices and methods for controlling the motion of a heavy-duty vehicle.

U.S. Pat. No. 5,579,230 A discloses systems and methods for determining vehicle speed during braking.

A global positioning system (GPS) receiver is often able to determine vehicle SOG, but satellite systems are prone to error in environments with strong multipath radio propagation and of course require a clear view of the sky to operate, which is not always available. Camera systems may also be used, but these are costly and less effective in certain weather conditions. Radar transceivers may be used to determine vehicle SOG, but may give inaccurate results when interference from other radar transceivers is strong, or when a stable stationary reference point cannot be identified.

To summarize, there is a continuing need for reliable and cost-effective methods of determining vehicle SOG suitable for use in heavy-duty vehicles, and in particular for heavy-duty vehicles controlled based on wheel slip.

SUMMARY

It is an object of the present disclosure to provide improved methods for determining the SOG of a heavy-duty vehicle, and for performing vehicle motion management of heavy-duty vehicles. The object is obtained by a VMM system for a heavy-duty vehicle. The system comprises at least one wheel speed sensor configured to output a wheel speed signal indicative of a rotation speed of a respective wheel on the vehicle and also at least one IMU configured to output an IMU signal indicative of an acceleration of the vehicle. The system also comprises a motion estimation function configured to estimate a vehicle motion state comprising vehicle speed over ground based on the at least one wheel speed signal and on the at least one IMU signal. The motion estimation function is arranged to estimate a respective SOG error associated with the wheel speed signal as an increasing function of an applied torque to the wheel and a respective SOG error associated with the IMU signal as an increasing function of a time duration elapsed since last calibration of an integrator of the IMU signal. The motion estimation function is also configured to estimate the vehicle SOG based on a weighted combination of the at least one wheel speed signal and the at least one IMU signal, where the weights of the weighted combination are determined based on the SOG error associated with the wheel speed signal and on the SOG error associated with the IMU signal.

Thus, a robust estimate of vehicle speed over ground is provided. The system considers the detrimental effect on accuracy of the wheel speed sensors by applied torque, and balances this against the drift of the IMU-based speed over ground estimate, which is an advantage.

The SOG error associated with the wheel speed signal is preferably a non-decreasing polynomial function of the applied torque to the wheel, which can be realized without significant computational burden.

The SOG error associated with the wheel speed signal may also be a function of road friction and/or a normal force of the wheel. Accounting for road friction and/or normal load of the wheel improves the accuracy of the SOG error model, since both these parameters mat have a large effect on wheel slip, which is the main cause of error when it comes to estimating vehicle speed over ground using a wheel speed sensor. The SOG error model can advantageously also be complemented by accounting for variation in slip stiffness value of the wheel. The SOG error associated with the IMU signal can be a function of a pre-determined bias value of the IMU. This bias value is often well specified, at least in terms of its statistics, in the data sheets of the IMU hardware, which is an advantage. By accounting for this bias an accurate model of IMU error is obtained, at least when it comes to applications involving integration of the IMU output signal to obtain vehicle speed. The SOG error associated with the IMU signal is preferably but not necessarily also a function of a pre-determined noise power characteristic of the IMU.

The motion estimation function is optionally arranged to calibrate the integrator of the IMU signal based on the wheel speed signal, on the SOG error associated with the wheel speed signal, and on an associated acceptance criterion. This way the IMU integrator can be calibrated in a reliable manner, and used during periods of time when wheel slip is large, without jeopardizing the overall vehicle motion control.

The VMM system may also comprise an MSD coordination function configured to coordinate actuation of a plurality of MSDs of the heavy-duty vehicle in dependence of a vehicle motion request and in dependence of the vehicle SOG, where at least one MSD is arranged to control the applied torque to the wheel. This MSD coordination function can be arranged to output data indicative of a wheel slip set-point and/or a torque set-point of the at least one wheel to the motion estimation function, and the motion estimation function can then estimate the respective SOG error associated with the wheel speed signal based on the data indicative of wheel slip set-point and/or torque set-point in an even more reliable manner.

The motion estimation function is optionally arranged to output a free-rolling request to the MSD coordination function in case the smallest of the SOG error associated with the wheel speed signal and the SOG error associated with the IMU signal fails to meet an acceptance criterion. The MSD coordination function may then reduce a wheel slip set-point of one or more wheels of the heavy-duty vehicle in response to receiving the free-rolling request from the motion estimation function. This way the motion estimation function can, at least temporarily, increase the accuracy in the wheel speed sensor signal for determining vehicle speed over ground. This increase can be obtained on demand, i.e., when needed, which is an advantage. The free-rolling event is preferably temporary, and so does not have a significant effect on the overall motion capability of the heavy-duty vehicle. In fact, by triggering free-rolling to get better information on vehicle speed over ground, the wheel slip control is often improved by an amount which compensates for the temporary reduction in tyre force generation capability by the vehicle.

The MSD coordination function is optionally configured to coordinate actuation of the plurality of MSDs of the heavy-duty vehicle based on the solution to a constrained optimization problem, where one or more constraints of the constrained optimization problem is arranged to be configured in dependence of if the free-rolling request has been received. Thus, the impact of the free-rolling is minimized since it will be automatically compensated for by the optimization routine.

According to some aspects, the MSD coordination function is arranged to reduce respective wheel slip set-points of the one or more wheels of the heavy-duty vehicle in a pre-determined or randomized sequence, where each wheel in the sequence is placed in a low slip condition for a pre-determined duration of time. This way the impact of the free-rolling on the motion of the vehicle is reduced.

There is also disclosed herein control units, vehicles, computer programs, computer readable media, and computer program products associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The above, as well as additional objects, features and advantages, will be better understood through the following illustrative and non-limiting detailed description of exemplary embodiments, wherein:

FIGS. 3A-E illustrate example sensor signal error models;

FIG. 5 illustrates an example vehicle control function architecture;

DETAILED DESCRIPTION

Figure 1:
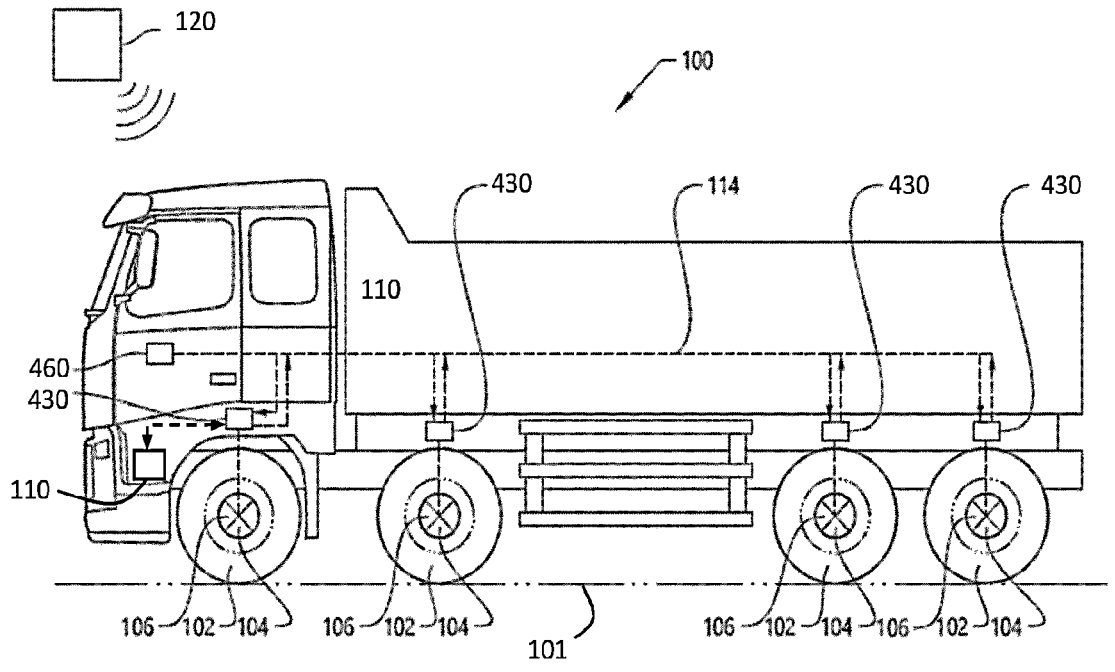
FIG. 1 illustrates an example heavy-duty vehicle.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

FIG. 1 illustrates an example heavy-duty vehicle 100, here in the form of a truck. It is appreciated that the herein disclosed methods and control units can be applied with advantage also in other types of heavy-duty vehicles, such as semi-trailers, trucks with drawbar connections, construction equipment, buses, and the like. The vehicle 100 may also comprise more than two vehicle units, i.e., more than one towed vehicle unit. A dolly vehicle unit may for instance be used to tow more than one trailer.

The example vehicle 100 comprises a plurality of wheels 102, wherein at least a subset of the wheels 102 comprises a respective motion support device (MSD) 104. Although the embodiment depicted in FIG. 1 illustrates an MSD 104 for each of the wheels 102, it should be readily understood that e.g., one pair of wheels 102 may be arranged without such an MSD 104. Also, an MSD may be connected to influence more than one wheel, e.g., via a differential drive arrangement or the like.

At least some of the wheels 102 on the vehicle 100 are equipped with wheel speed sensors 106. A wheel speed sensor is a sensor which measures the rotation speed of the wheel, e.g., based on a Hall effect sensor, a rotary encoder, or the like. Wheel speed sensors are generally known and will therefore not be discussed in more detail herein.

The MSDs 104 may be arranged to apply a torque to a respective wheel of the vehicle or to both wheels of an axle, e.g., via a differential arrangement. The MSD may be a propulsion device, such as an electric machine arranged to e.g., provide a longitudinal wheel force to the wheel(s) of the vehicle 100. Such an electric machine may be adapted to generate a propulsion torque as well as a braking torque by operating the electric machine in a regenerative mode of operation.

The MSDs 104 may also comprise friction brakes such as disc brakes or drum brakes arranged to generate a braking torque by the wheel 102 in order to decelerate the vehicle. Herein, the term acceleration is to be construed broadly to encompass both positive acceleration (propulsion) and negative acceleration (braking).

Each MSD 104 is connected to an MSD control unit 430 arranged for controlling various operations of the MSD 104. The MSD control system, i.e., the system of MSD control units, is preferably a decentralized system running on a plurality of separate wheel-end computers, although centralized implementations are also possible. It is furthermore appreciated that some parts of the MSD control system may be implemented on processing circuitry remote from the vehicle, such as on a remote server 120 accessible from the vehicle via wireless link. Each MSD control unit 430 is connected to a VMM system or function 460 of the vehicle 100 via a data bus communication arrangement 114 that can be either wired, wireless or both wired and wireless. Hereby, control signals can be transmitted between the VMM function 460 and the MSD control units 430. The VMM function 460 and the MSD control units 430 will be described in more detail below in connection to FIG. 4 and FIG. 5.

The VMM function 460 as well as the MSD control unit or units 430 may include a microprocessor, microcontroller, programmable digital signal processor or another programmable device. The systems may also, or instead, include an application specific integrated circuit, a programmable gate array or programmable array logic, a programmable logic device, or a digital signal processor. Where the system(s) include(s) a programmable device such as the microprocessor, microcontroller or programmable digital signal processor mentioned above, the processor may further include computer executable code that controls operation of the programmable device. Implementation aspects of the different vehicle unit processing circuits will be discussed in more detail below in connection to FIG. 9.

Generally, the MSDs on the vehicle 100 may also comprise, e.g., a power steering device, active suspension devices, and the like. Although these types of MSDs cannot be used to directly generate longitudinal force to accelerate or brake the vehicle, they are still part of the overall vehicle motion management of the heavy-duty vehicle and may therefore form part of the herein disclosed methods for vehicle motion management. Notably, the MSDs of the heavy-duty vehicle 100 are often coordinated in order to obtain a desired motion by the vehicle. For instance, two or more MSDs may be used jointly to generate a desired propulsion torque or braking torque, a desired yaw motion by the vehicle, or some other dynamic behavior. Coordination of MSDs will be discussed in more detail in connection to FIG. 5, where MSD coordination sub-functions of the VMM function are discussed.

Longitudinal wheel slip $\lambda_x$ may, in accordance with SAE J470 (SAE Vehicle Dynamics Standards Committee Jan. 24, 2008) be defined as $$\lambda_x = \frac{R\omega_x - v_x}{\max(|R\omega_x|, |v_x|)}$$

where R is an effective wheel radius in meters, $\omega_x$ is the angular velocity of the wheel, and $v_x$ is the longitudinal speed of the wheel (in the coordinate system of the wheel). Thus, $\lambda_x$ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel. The VMM function 460 and optionally also the different MSD control units 430 maintain information on $v_x$ in the reference frame of the wheel, while a wheel speed sensor 106 can be used to determine $\omega_x$ (the rotational velocity of the wheel).

Slip angle $\alpha$, also known as sideslip angle, is the angle between the direction in which a wheel is pointing and the direction in which it is actually traveling (i.e., the angle between the longitudinal velocity component $v_x$ and the vector sum of wheel forward velocity $v_x$ and lateral velocity $v_y$. This slip angle results in a force, the cornering force, which is in the plane of the contact patch and perpendicular to the intersection of the contact patch and the midplane of the wheel. The cornering force increases approximately linearly for the first few degrees of slip angle, then increases non-linearly to a maximum before beginning to decrease.

The slip angle, $\alpha$ is often defined as $$\alpha = \arctan\left(\frac{v_y}{|v_x|}\right)$$

where $v_y$ is the lateral speed of the wheel in the coordinate system of the wheel.

Herein, longitudinal speed over ground may be determined relative to the vehicle, in which case the speed direction refers to the forward direction of the vehicle or relative to a wheel, in which case the speed direction refers to the forward direction, or rolling direction, of the wheel. The same is true for lateral speed over ground, which can be either a lateral speed of the vehicle or a lateral speed over ground of a wheel relative to its rolling direction. The meaning will be clear from context, and it is appreciated that a straight forward conversion can be applied in order to translate speed over ground between the coordinate system of the vehicle and the coordinate system of the wheel, and vice versa. Vehicle and wheel coordinate systems are discussed, e.g., by Thomas Gillespie in "Fundamentals of Vehicle Dynamics" Warrendale, PA: Society of Automotive Engineers, 1992.

In order for a wheel (or tyre) to produce a wheel force which affects the motion state of the heavy-duty vehicle, such as an acceleration, slip must occur. For smaller slip values the relationship between slip and generated force is approximately linear, where the proportionality constant is often denoted as the slip stiffness $C_x$ of the tyre. A tyre is subject to a longitudinal force $F_x$, a lateral force $F_y$, and a normal force $F_z$. The normal force $F_z$ is key to determining some important vehicle properties. For instance, the normal force to a large extent determines the achievable longitudinal tyre force $F_x$ by the wheel since, normally, $F_x \leq \mu F_z$, where $\mu$ is a friction coefficient associated with a road friction condition. The maximum available lateral force for a given wheel slip can be described by the so-called Magic Formula as described in "Tyre and vehicle dynamics", Elsevier Ltd. 2012, ISBN 978-0-08-097016-5, by Hans Pacejka, where wheel slip and tyre force is also discussed in detail.

Figure 2:
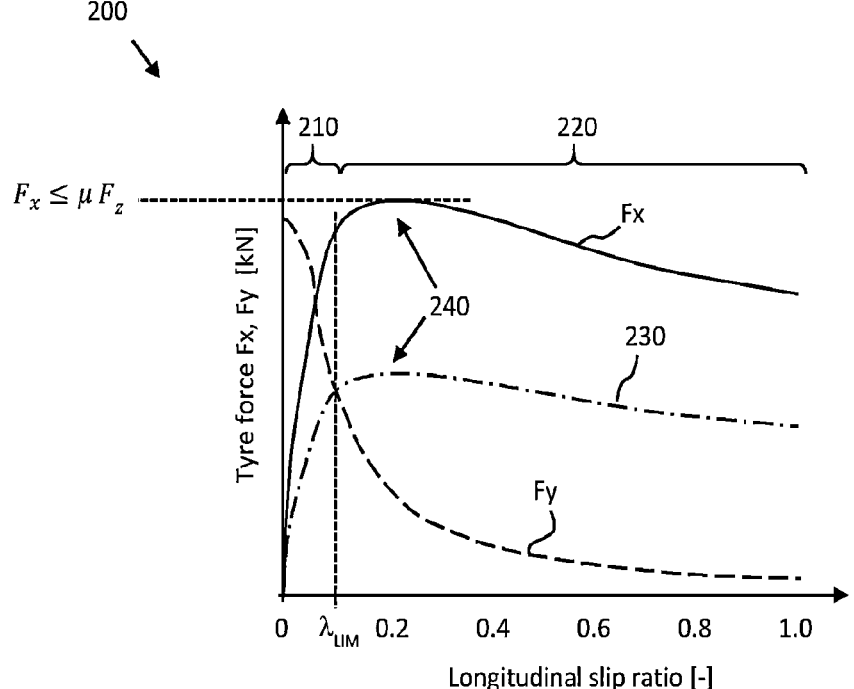
FIG. 2 is a graph showing example tyre forces as function of wheel slip.

FIG. 2 is a graph showing an example 200 of achievable tyre forces as function of longitudinal wheel slip. Fx is the longitudinal tyre force while Fy is the maximum obtainable lateral wheel force for a given wheel slip. This type of relationship between wheel slip and generated tyre force is often referred to as an inverse tyre model, and it is generally known in the art of vehicle dynamics and vehicle control. The examples in FIG. 2 are for positive wheel forces, i.e., acceleration. Similar relationships exist between wheel slip and negative wheel force, i.e., braking.

An inverse tyre model, such as the model 200 illustrated in FIG. 2, can be used to translate between a desired longitudinal tyre force $F_x$ and a corresponding longitudinal wheel slip $\lambda_x$. The interface between VMM and MSDs capable of delivering torque to the vehicle's wheels has as mentioned above traditionally been focused on torque-based requests sent to each MSD control unit 430 from the VMM function 460 without any consideration towards wheel slip. However, this approach has some performance limitations. In case a safety critical or excessive slip situation arises, then a relevant safety function (traction control, anti-lock brakes, etc.) operated on a separate control unit normally steps in and requests a torque override in order to bring the slip back into control. A problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance.

Significant benefits can be achieved by instead using a wheel speed or wheel slip-based request on the interface between the VMM function 460 and the MSD control units 430, thereby shifting the difficult actuator speed control loop to the MSD controllers which are closer to the wheels and are therefore generally able to operate with a much shorter control latency compared to that of the central VMM function 460. This type of architecture can provide much better disturbance rejection compared to a torque-based control interface and thus improves the predictability of the forces generated at the tyre road contact patch.

Referring again to FIG. 2, the example longitudinal tyre force Fx shows an almost linearly increasing part 210 for small wheel slips, followed by a part 220 with more non-linear behavior for larger wheel slips. It is desirable to maintain vehicle operation in the linear region 210, where the obtainable longitudinal force in response to an applied brake command is easier to predict, and where enough lateral tyre force can be generated if needed. To ensure operation in this region, a wheel slip limit $\lambda_{lim}$ on the order of, e.g., 0.1 or so, can be imposed on a given wheel. Thus, having accurate knowledge of current wheel slip, operation in the linear region can be ensured, which greatly simplifies vehicle motion control for both safety, efficiency, and driver comfort.

A further benefit of this wheel-slip based control approach is that variations in road friction is handled in an efficient manner. A decrease in road friction generally results in an approximative scaling of the inverse tyre model in the tyre force (y-axis) dimension, as exemplified by the dash-dotted curve 230 in FIG. 2. Note that the point of peak force 240 stays at basically the same level of wheel slip for different road friction conditions and normal forces. Hence, a wheel controller which is able to maintain a given degree of wheel slip, say $\lambda=0.2$, despite rapid changes in operating conditions of the wheel 106, will automatically adjust to the change in friction.

A problem encountered when using wheel slip to actively control one or more wheels on a heavy-duty vehicle, such as the vehicle 100, and also when executing more low complex control such as imposing the above-mentioned wheel slip limit $\lambda_{lim}$ locally at wheel end, is that the SOG $v_x$ of the wheel (and of the vehicle) may not be accurately known. For instance, if only wheel speed sensors 106 such as Hall effect sensors or rotational encoders are used to determine vehicle SOG, then the vehicle SOG will be erroneously determined in case the wheels used for estimating the SOG are themselves slipping excessively.

Satellite based positioning systems can as mentioned above be used to determine the SOG of a heavy-duty vehicle 100 and of any given wheel on the vehicle 100. However, these systems do not function well in some environments, such as environments without a clear view of the sky. Multipath propagation of the satellite radio signals can also induce large errors in the estimated vehicle position, which then translates into errors in the estimated vehicle SOG.

Vision-based sensor systems and radar systems can also be used to determine vehicle SOG. However, such systems are relatively costly and not always without issues when it comes to accuracy and reliability. Vision-based sensor may for instance suffer from performance degradation due to sun glare and fog, while radar sensor systems may be prone to interference from other radar transceivers. Both vision-based sensors and radar-based sensors also require identification of a stationary object in the ambient environment which can be used as reference when determining the speed over ground, which may not always be easy to achieve.

For these and other reasons, a combination of IMUs and wheel speed sensors are commonly used for vehicle speed over ground estimation in heavy-duty vehicles. As long as there is no torque applied to a wheel, or significant yaw motion by the vehicle, its associated wheel slip on at least some of the wheels on the vehicle is likely small, meaning that the wheel speed data is most likely also an accurate representation of the SOG of the vehicle, or at least for some parts of the vehicle, or a vehicle unit of a vehicle combination. During periods of high wheel slip, such as when there is a high applied torque to a wheel, the IMU signal can be temporarily relied upon to estimate vehicle SOG. In this way the periods of high wheel slip (and unreliable wheel speed sensor data for determining vehicle speed over ground) can be "bridged" by instead relying on the IMU signal to track the vehicle SOG until the wheel slip of one or more wheels becomes small enough for the wheel speed signals to be relied upon again. The different VMM functions 460 described herein are arranged to base the estimated vehicle motion state s mainly on the IMU signal in case of an applied torque at the wheel 102, 410 on the vehicle 100, and mainly on the wheel speed signal otherwise. In other words, if there is no or only a little torque applied at a wheel, then that wheel speed data can be used for vehicle SOG determination, while the IMU signal is instead relied upon to determine vehicle SOG during periods of high applied torque. According to a preferred implementation of the techniques proposed herein the vehicle SOG $v_x$ is determined based on a weighted combination of at least one wheel speed signal from a wheel speed sensor and on at least one IMU signal from an IMU, where the weights of the weighted combination are determined based on an estimated SOG error associated with the wheel speed signal and on an estimated SOG error associated with the IMU signal. These SOG errors are indicative of the accuracy of the SOG data from the different sensor types, and can therefore advantageously be used in the weighted combination. The SOG errors can be either relative or absolute, and different SOG errors may be determined for different sensors of the same type, i.e., two different wheel speed sensors may be associated with different magnitudes of SOG error, e.g., if different amounts of torque are applied at the two wheels. A large magnitude SOG error results in a relatively small weight in the weighted combination, and vice versa.

A problem with most IMUs used for determining vehicle SOG is the drift caused by inaccuracies and bias in the IMU output. To reduce issues with IMU drift, it is proposed herein to model the error incurred by integrating the IMU signal to obtain vehicle SOG. When this modelled error becomes unacceptably large, the estimated SOG based on the IMU signal can be calibrated or "reset" based on wheel speed sensor data using data from one or more free-rolling wheels, or at least from wheels where applied torque is small, such as below a predetermined threshold. If no suitable low-slip wheel is available to perform the calibration, then the method may temporarily reduce the applied torque at one or more wheels, "sample" the vehicle speed by the reduced-torque wheel speed sensor, and then re-apply the torque to the wheel to continue the vehicle maneuver. Thus, according to an optional example of the techniques proposed herein, the VMM function 460 selectively and temporarily places one or more wheels in a free-rolling condition (or at least in a condition where wheel slip is small) in order to obtain reliable vehicle SOG data from the wheel speed sensor of the free-rolling wheel. Once the vehicle SOG has been determined in this manner, it can be used to calibrate the IMU-based vehicle SOG estimate, thereby decreasing the associated SOG error in the IMU integrator, and allowing it to be used for another period of time. The VMM function 460 may reduce wheel slip of one or more wheels on the heavy-duty vehicle, e.g., by introducing constraints into a mathematical optimization problem solved to obtain the MSD coordination solution which fulfils the global force requirements. The reduction can be temporary or extend over a longer period of time. In case the slip reduction is temporary, the function is similar to an anti-lock braking function (ABS) which intermittently reduces wheel slip in a periodic manner. When the wheel slip of a given wheel is reduced, the reliability of the vehicle SOG data obtainable from the wheel speed sensors of that wheel increases.

To summarize the discussion so far, there is disclosed herein a VMM system 460 for a heavy-duty vehicle 100. The system comprises at least one wheel speed sensor 106 configured to output a wheel speed signal indicative of a rotation speed $\omega_x$ of a respective wheel 102 on the vehicle 100 and at least one IMU 110 configured to output an IMU signal indicative of an acceleration $\alpha_x$ of the vehicle 100. A motion estimation function which may form part of the VMM system 460, but which may also be separate from the VMM function 460, is configured to estimate a vehicle motion state s comprising the vehicle SOG $v_x$ based on the at least one wheel speed signal and on the at least one IMU signal. The motion estimation function is also arranged to estimate a respective SOG error associated with the wheel speed signal as an increasing function of an applied torque to the wheel 102, and a respective SOG error associated with the IMU signal as an increasing function of a time duration elapsed since a calibration of an integrator of the IMU signal. The motion estimation function is also configured to estimate the vehicle SOG $v_x$ based on a weighted combination of the at least one wheel speed signal and the at least one IMU signal, where the weights of the weighted combination are determined based on the SOG error associated with the wheel speed signal and on the SOG error associated with the IMU signal.

The motion estimation function may, for instance, implement the weighted combination by a sensor fusion algorithm where the data from the wheel speed sensors of the vehicle and the data from the IMU or IMUs of the vehicle are merged into an estimate of vehicle motion state. Such sensor fusion can be implemented by known methods, e.g., in a Kalman filter or the like where the weights can be incorporated as variances of the different input data sources. The motion estimation function may also be less complex, such as simply switching between vehicle SOG estimation based on one or more wheel speed signals and vehicle SOG estimation based on an integrated IMU acceleration signal, which can be seen as a weighted combination where the weights are binary—zero or one, with only one non-zero weight allowed at a time. A straight forward weighted combination of the two or more SOG data sources can also be used. The weighted combination is generally performed such that a data source (IMU signal or wheel speed signal) with small magnitude SOG error is given more weight compared to a data source with larger magnitude SOG error. The SOG errors used to perform the weighting can be relative or absolute.

Generally, an estimated parameter $\hat{v}$, such as a vehicle SOG, which is estimated based on a weighted combination of N parameters $\{v_1, v_2, \ldots, V_N\}$ can be written as $$\hat{v} = \sum_{i=1}^{N} w_i v_i$$

where $\Sigma_{i=1}^{N} w_i = 1$, and the relative magnitudes of the weights $w_i$ is configured in dependence of the perceived reliability of the corresponding parameter $v_i$. The sensor fusion operation performed to estimate the vehicle SOG will assign more weight to the data from the IMU 110 in case the IMU integrator has recently been calibrated, e.g., reset by a vehicle SOG value obtained from a reliable source, compared to when the IMU acceleration signals have been integrated for a longer duration of time without calibration. The sensor fusion operation performed to estimate the vehicle SOG will also assign more weight to the data from the wheel speed sensor 106 in case no torque is applied at the wheel, and less weight is more torque is applied at the wheel.

Consequently, in case the IMU estimator performance is very good while the wheels are slipping badly, then the IMU weight parameter $w_i$ may be close to one, but if the IMU data is not deemed accurate and/or if there is no significant wheel slip on some of the wheels, then the weight parameter $w_i$ of the IMU data will be reduced in relation to the weights of the estimate coming from the wheel speed sensors, and optionally also the other data sources, such as an estimate coming from the GPS system.

Referring back to FIG. 2, the SOG error associated with the wheel speed signal 401 can be a non-decreasing polynomial function of the applied torque to the wheel 102, e.g., a linear or quadratic function of the applied torque at the wheel. This type of SOG error model often makes sense since the wheel slip (and consequently also the difference between the wheel speed signal and the actual vehicle SOG) increases with increased tyre force, and tyre force in turn increases with applied torque. According to a similar line of reasoning, the SOG error associated with the wheel speed signal 401 may additionally be configured as a function of road friction p and/or a normal force Fz of the wheel 102. In this case the SOG error model indicates a larger error in case road friction and/or normal force is small compared to when road friction and/or normal load is large—for the same applied torque. As mentioned above, the product of road friction and normal force has an impact on the wheel slip behavior of a wheel. The road friction, the normal load, or the product or the two can therefore be used with advantage to parameterize the model of the SOG error associated with the wheel speed signal 401. The SOG error associated with the wheel speed signal 401 may also be configured as a function of a slip stiffness value Cx of the wheel 102. This is because the slip stiffness of the tyre has an impact on the wheel slip behavior also, as discussed above in connection to FIG. 2. Thus, given a set of parameters, such as road friction, normal load, and/or slip stiffness, a function can be parametrized to take applied torque as input and output an estimated SOG error associated with the wheel speed signal 401.

Generally, the SOG error associated with the wheel speed signal 401 may be configured as a function which is parameterized by one or more parameters, including those discussed above. The function and its parametrization may be determined by computer simulation, practical experimentation, or mathematical analysis. The function can be tabulated as a look-up table, or formulated as an analytical function, e.g., using a polynomial model or the like.

The IMU output signal is indicative of an acceleration by the IMU component, so an estimated vehicle SOG can be obtained by integrating this IMU acceleration signal starting from a known or at least approximately known vehicle SOG, using a straight forward integration or a more advanced filter, such as a Kalman filter configured to determine vehicle SOG based at least in part on the IMU signal. However, the IMU signal is often biased, and normally also comprise a time-varying error, which will accumulate to cause an error in the estimated SOG. By characterizing the IMU in terms of this bias and error, a model of the error in the estimated vehicle SOG determined from the IMU signal can be constructed. For example, in case the IMU output signal of vehicle longitudinal acceleration $â_x$ is roughly modelled as $$â_x = a_x + b + n$$

where $α_x$ is the true vehicle longitudinal acceleration (over ground), b is a constant unknown bias and n is some form of time-varying measurement noise, such as Gaussian zero mean noise with variance $σ^2$, then the accumulated error can be modelled as function of time as $$e(T) = \int_0^T b + n(t)\, dt$$

If the statistical distribution of the bias b and the measurement noise n is at least approximately known, then the statistics of the error e(t) can also be determined using straight-forward statistical methods, numerical methods, or just by practical experimentation using, e.g., computer simulation. This data can then form basis for the SOG error associated with the IMU signal 402. Alternatively, a polynomial function such as a linear or quadratic function of time can be assumed, and adapted to fit with experiments of the error after integrating the IMU signal over time, e.g., by least-squares fit to measurement data.

The SOG error associated with the IMU signal 402 is advantageously configured as a function of a pre-determined bias value of the IMU 110, which could be determined beforehand at the factory, such as from the specification of the IMU hardware. This SOG error could then be determined as a form of worst-case or percentile error. The SOG error associated with the IMU signal 402 may also be configured as a function of a pre-determined noise power characteristic of the IMU 110.

To summarize, both the SOG error associated with the wheel speed signal 401 and the SOG error associated with the IMU signal may be parameterized functions, where the parameters can be adapted based on analysis and/or based on experimentation. The functions can also be updated over time, e.g., by evaluating the impact of the various parameters on the magnitude of the SOG error.

FIG. 3A shows an example model 300 of SOG error associated with the IMU signal 402 as function of time. The SOG error is here assumed to follow a linear model which increases with time. When this model gives an estimated error exceeding a threshold Th, then a free-rolling request can be triggered (at 310), which results in a re-calibration of the IMU integrator, and consequently a reset of the SOG error. This optional triggering of a free-rolling request will be discussed in more detail below. The SOG error is again reset at 315 (before it reaches the threshold), e.g., because accurate vehicle SOG data became available to the system at that point in time, whereupon the IMU integrator was re-calibrated using the accurate SOG data. Generally, the VMM system 460 discussed herein may be arranged to calibrate the integrator of the IMU signal based on the wheel speed signal 401 and on the SOG error associated with the wheel speed signal 401. A straight forward way to calibrate the integrator of the IMU signal is to just reset it using the SOG value obtained from the wheel speed sensor or sensors. The acceptance criterion applied to the wheel speed signal for triggering re-calibration of the IMU integrator can be a fixed threshold on the estimated error of the wheel speed signal, or some statistical measure of error. For instance, the system may require that the probability of the actual error exceeding some predetermined threshold is to be kept below some level.

FIG. 3B shows another example 320 where the SOG error model is instead quadratic. The SOG error is again reset (at 330) as other accurate vehicle SOG data became available at that point in time, which allowed the IMU integrator to be re-calibrated.

FIG. 3C illustrates an example 340 where the model of the IMU error is instead a step-function. This step function assumes a small value as long as no more than a given time period 350 has elapsed since last re-calibration of the IMU integrator. When this time instant is passed, the SOG error instead assumes a high value. This type of error model can be used if it is desired to switch between data sources, which is also a form of weighted combination, but using binary weights.

FIGS. 3D and 3E show example models 360, 380 for the SOG error associated with the wheel speed signal 401. A linear model is assumed in FIG. 3D, while a quadratic model is assumed in FIG. 3E, both are examples of more general polynomial models. Example thresholds Th1, Th2 for re-calibration of the IMU integrator are also shown. In this example, the IMU integrator is continuously or at least periodically re-calibrated using the wheel speed vehicle SOG data as long as the SOG error associated with the wheel speed signal 401 is of a magnitude below the threshold. Thus, in the examples, the re-calibration is suspended at applied torques goes above the acceptance criteria at 370, 390, i.e., where the wheel speed sensor SOG error breaches the thresholds Th1, Th2.

All of the example models 300, 320, 340, 360, 380 can as mentioned above be parameterized beforehand, by computer simulation, practical experimentation, and/or mathematical analysis. Such parameterization may for instance involve comparisons between the IMU signal or an estimate of vehicle SOG based on an integrated IMU signal and some form of ground truth reference SOG, e.g., obtained from GPS. A parameterized polynomial P with K parameters may be written on the form $$P = \sum_{i=1}^{K} a_i \, x^k$$

where $\{\alpha_1, \alpha_2, \ldots, \alpha_K\}$ are the parameters of the parameterized function.

Figure 4:
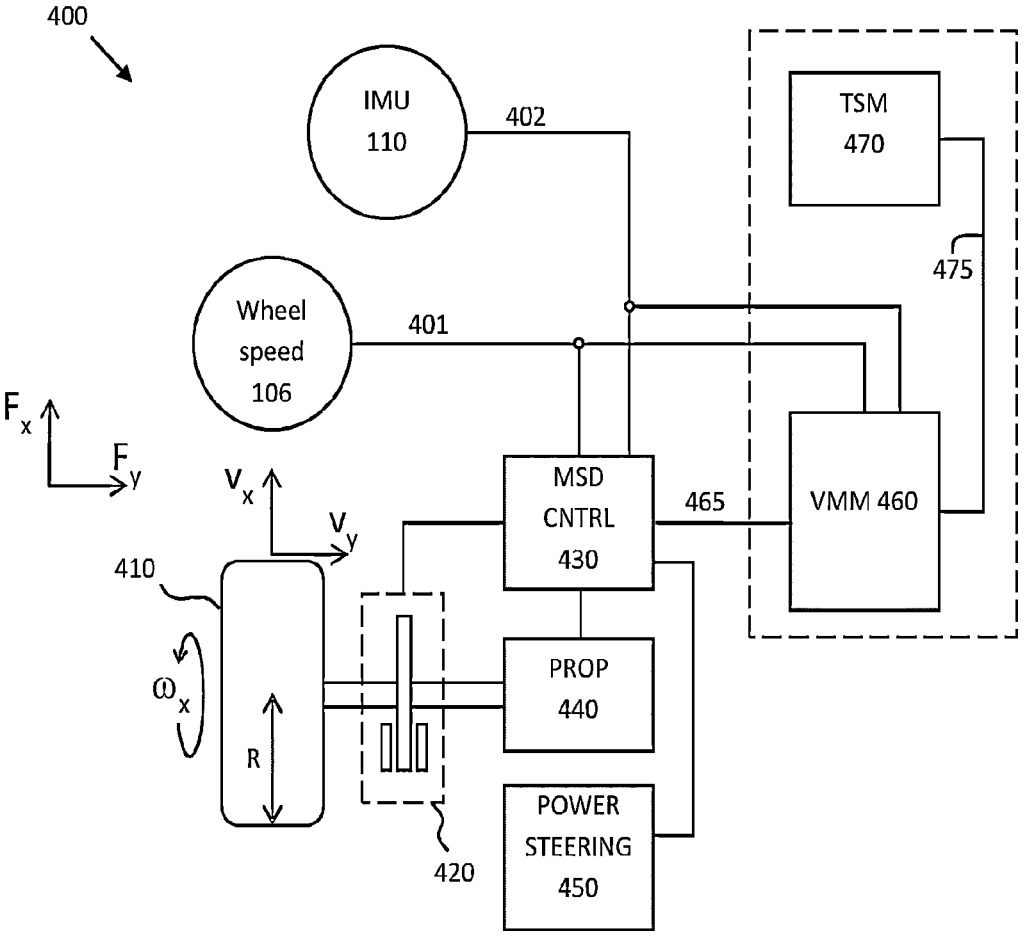
FIG. 4 shows an example motion support device control arrangement.

FIG. 4 schematically illustrates functionality 400 for controlling a wheel 410 on the vehicle 100 by some example MSDs here comprising a friction brake 420 (such as a disc brake or a drum brake), a propulsion device 440 and a power steering arrangement 450. The friction brake 420 and the propulsion device 440 are examples of wheel torque generating devices, which can be controlled by one or more motion support device control units 430. The control is based on measurement data obtained from a wheel speed sensor 106, i.e., a wheel speed signal 401, in combination with data from one or more IMUs 110, referred to herein as an IMU signal 402 and optionally also based on data from other vehicle state sensors, such as radar sensors, lidar sensors, and also vision based sensors such as camera sensors and infra-red detectors. An MSD control unit 430 may be arranged to control one or more MSD actuators. For instance, it is common that a single MSD control unit 430 is arranged to control both wheels on an axle.

The traffic situation management (TSM) function 470 plans driving operation with a time horizon of 10 seconds or so. This time frame corresponds to, e.g., the time it takes for the vehicle 100 to negotiate a curve or the like. The vehicle maneuvers, planned and executed by the TSM function, can be associated with acceleration profiles and curvature pro-files which describe a desired target vehicle velocity in the vehicle forward direction and turning to be maintained for a given maneuver. The TSM function continuously requests the desired acceleration profiles $a_{req}$ and steering angles (or curvature profiles $c_{req}$) from the VMM function 460 which performs force allocation to meet the requests from the TSM function in a safe and robust manner. The VMM function 460 operates on a timescale of below one second or so and will be discussed in more detail below.

The wheel 410 has a longitudinal velocity component $v_x$ and a lateral velocity component $v_y$ (in the coordinate system of the wheel or in the coordinate system of the vehicle, depending on implementation). There is a longitudinal wheel force $F_x$ and a lateral wheel force $F_y$, and also a normal force $F_z$ acting on the wheel (not shown in FIG. 4). Unless explicitly stated otherwise, the wheel forces are defined in the coordinate system of the wheel, i.e., the longitudinal force is directed in the rolling plane of the wheel, while the lateral wheel force is directed normal to the rolling plane of the wheel. The wheel has a rotational velocity $\omega_x$ (measured by the wheel speed sensor 106), and an effective rolling radius R.

The motion estimation systems discussed herein are used at least in part to determine vehicle SOG, which can then be translated into wheel speed components $v_x$ and/or $v_y$, in the coordinate system of the wheel. This means that the wheel steering angle $\delta$ is taken into account if the wheel is a steered wheel, while a non-steered wheel has a longitudinal velocity component which is the same as the vehicle unit to which the wheel is attached, normally a truck or a trailer vehicle unit.

The type of inverse tyre models exemplified by the graph 200 in FIG. 2 can be used by the VMM 460 to generate a desired tyre force at some wheel. Instead of requesting a torque corresponding to the desired tyre force, the VMM can translate the desired tyre force into an equivalent wheel slip (or, equivalently, a wheel rotation speed relative to a SOG) and request this slip instead over the interface 465 to the MSD control unit 430. The main advantage being that the MSD control unit 430 will be able to deliver the requested torque with much higher bandwidth by maintaining opera-tion at the desired wheel slip, using the vehicle speed $v_x$ obtained from processing of the data from the IMU 110 and the wheel rotational velocity $\omega_x$ obtained from the wheel speed sensor 106. The control unit 430 or units can be arranged to store one or more pre-determined inverse tyre models in memory, e.g., as look-up tables or parameterized functions. An inverse tyre model can also be arranged to be stored in the memory as a function of the current operating condition of the wheel 410.

According to a simple example of the techniques pro-posed herein, as long as no torque is applied to a wheel, the vehicle speed data obtained from the wheel speed sensor 106 is deemed reliable and used at the MSD control unit 430 for determining vehicle SOG and/or fed back to the VMM function 460 where it is used as basis for determining vehicle SOG. If torque is applied, e.g., by the propulsion device 440 or the service brake 420, then the acceleration data from the IMU 110 is integrated in order to track the vehicle SOG in lieu of the data from the wheel speed sensor. This way the MSD control unit 430 can determine wheel slip during application of torque, since the vehicle SOG can be tracked for a limited duration of time using the IMU signal while the wheel speed sensor provides wheel speed infor-mation during the generation of tyre force.

Due to the accumulation of error in the integrated IMU signal, the accuracy of the vehicle SOG determined based on the IMU output signal is deteriorating over time. When the estimated error magnitude (obtained from the type of model discussed above) has become unacceptably large, a correc-tion of the IMU integrator can optionally be performed by placing the wheel in free-rolling condition, estimating vehicle SOG based on the wheel speed sensor, re-initializing the IMU integrator again and re-applying torque at the wheel. This free-rolling of the wheel can be triggered centrally by the VMM function 460 or locally at the MSD control unit 430.

FIG. 5 illustrates an example vehicle control function architecture applicable with the herein disclosed methods. In this example architecture, the TSM function 470 generates vehicle motion requests 475, which may comprise a desired steering angle δ or an equivalent curvature $c_{req}$ to be followed by the vehicle, and which may also comprise desired vehicle unit accelerations $a_{req}$ and also other types of vehicle motion requests, which together describe a desired motion by the vehicle along a desired path at a desired velocity profile.

It is understood that the motion requests can be used as base for determining or predicting a required amount of longitudinal and lateral forces which needs to be generated in order to successfully complete a maneuver. The TSM function 470 can of course also be replaced by driver input signals, from a steering wheel and pedals.

The VMM system operates with a time horizon of about 1 second or so, and continuously transforms the acceleration profiles $a_{req}$ and curvature profiles $c_{req}$ from the TSM function 470 into control commands for controlling vehicle motion functions, actuated by the different MSDs of the vehicle 100, that in turn report back respective capabilities to the VMM function 460. The capabilities can then be used as constraints in the vehicle control. The VMM system performs vehicle state or motion estimation, by a motion estimation function 510 as discussed above, i.e., the VMM system continuously determines a vehicle state s comprising, e.g., positions, speeds, accelerations, and articulation angles of the different units in the vehicle combination by monitoring operations using various sensors 540 arranged on the vehicle 100, often but not always in connection to the MSDs. An important input to the motion estimation function 510 are the signals from IMU 110 and the wheel speed sensors 106 on the heavy duty vehicle 100.

The result of the motion estimation 510, i.e., the estimated vehicle state s comprising the speed over ground of the vehicle 100, is input to a force generation module 520 which determines the required global forces $V=[V_1, V_2]$ for the different vehicle units to cause the vehicle 100 to move according to the requested acceleration and curvature profiles $a_{req}$, $c_{req}$, and to behave according to the desired vehicle behavior. The required global force vector V is input to an MSD coordination function 530 which allocates wheel forces and coordinates other MSDs such as steering and suspension. The MSD coordination function outputs an MSD control allocation for the i:th wheel, which may comprise any of a torque $T_i$, a longitudinal wheel slip $\lambda_i$, a wheel rotational speed $\omega_i$, and/or a wheel steering angle $\delta_i$. The coordinated MSDs then together provide the desired lateral Fy and longitudinal Fx forces on the vehicle units, as well as the required moments Mz, to obtain the desired motion by the vehicle combination 100.

The example VMM function 460 in FIG. 5 manages both force generation and MSD coordination, i.e., it determines what forces that are required at the vehicle units in order to fulfil the requests from the TSM function 470, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels. The forces are determined such as to generate the vehicle behavior which is expected by the TSM function in response to the control inputs generated by the TSM function 470.

The motion estimation function 510 is, as discussed above, configured to estimate at least vehicle SOG, based on the wheel speed signal 401 from the wheel speed sensors 106 and also on the IMU signal 402 from the IMU 110. The motion estimation function is also arranged to model an error in the estimated vehicle motion state s (at least for the vehicle SOG) and optionally to output a free-rolling request 550 to the MSD coordination function 530 (or to some equivalent software module) in case the modelled error fails to meet an acceptance criterion, e.g., a threshold or some pre-determined confidence interval. The modelling of the error can also be of varying complexity, as discussed above. A simple linear function increasing with time can for instance be used to model the error. More advanced error modelling methods may account also for other sources of information, and more than one sensor device. The MSD coordination function 530 is optionally configured to reduce a wheel slip set-point of one or more wheels 102 of the heavy-duty vehicle 100 in response to receiving the free-rolling request 550 from the motion estimation function 510. The MSD coordination function 530 may for instance be arranged to set a wheel slip request or torque request for one or more wheels 102 of the heavy-duty vehicle 100 to zero in response to receiving the free-rolling request 550, i.e., inactivating the torque actuators associated with a given wheel or with a given set of wheels. This reduction in wheel slip set-point of the one or more wheels 102 of the heavy-duty vehicle 100 results in a decrease in wheel slip, and therefore an increase in the accuracy of the vehicle SOG data obtained from the wheel speed sensors of the wheels with reduced wheel slip set-point. This increased accuracy vehicle speed information can then be used by the motion estimation function to reset the IMU-based vehicle speed estimate, allowing the IMU data to be used anew.

The MSD coordination function 530 can according to an example realization comprise elements of mathematical optimization, e.g., a quadratic optimization routine or the like, in order to obtain a desired motion by the vehicle, or more low complex, such as using positive torque generating actuators in case acceleration is desired and negative torque generating actuators if deceleration is desired. Various types of MSD coordination functions are known in the art and the topic will therefore not be discussed in more detail herein. It is noted that the MSD coordination function can be of varying complexity, ranging from a simple connection between control input means of the vehicle (steering wheel, pedals, etc) and MSD actuators, to more advanced control methods.

The MSD coordination function 530 may for instance implement a mathematical optimization routine which finds an MSD force allocation that corresponds to the required global forces determined by the force generation module 520. The mathematical optimization routine involves constraints, which are limits on the forces possible to generate by a given MSD. Thus, the MSD coordination function 530 can be used to reduce or even remove the wheel slip on one or more wheels 410, which facilitates a more accurate determination of vehicle speed using wheel speed sensors 106. The constraints may be imposed as a wheel slip limit or as a torque limit, which can be set to some small value or even to a zero value where the wheel is essentially in free-rolling state. According to some aspects, as mentioned above, the MSD coordination function 530 is arranged to set a wheel slip request and/or a torque request for one or more wheels 410 of the heavy-duty vehicle 100 to zero in response to receiving the free-rolling request 550. Thus, there will be no positive nor negative wheel forces generated in the longitudinal direction of the wheel, which means that the impact on vehicle speed determination based on wheel speed of the wheel is minimized or at least reduced.

According to some other aspects, the MSD coordination function 530 is arranged to reduce a wheel slip set-point of the one or more wheels 410 of the heavy-duty vehicle 100 in a sequence, where each wheel in the sequence is placed in a low slip condition for a pre-determined short duration of time, such as a second or half a second. This way the actuation over the vehicle can be maintained, since each wheel will only be placed in a low slip condition for a short period of time, after which it can resume force generation. This mode of operation will be discussed in more detail below in connection to FIG. 6.

The MSD coordination function 530 is, as mentioned above, optionally configured to coordinate actuation of the plurality of MSDs of the heavy-duty vehicle based on the solution to a constrained optimization problem, where one or more constraints of the constrained optimization problem is arranged to be configured in dependence of an estimated error magnitude associated with a vehicle SOG based on the IMU signal, as discussed above, e.g., in connection to FIGS. 3A-E. This means that the MSD coordination function 530 can simply solve the optimization problem under the constraints that allocated wheel slips at one or more wheels of the heavy-duty vehicle should be kept below some threshold, or even be set to zero, in order to reset the IMU integrator error and enable continued reliable estimation of vehicle SOG.

It is noted that the optional free-rolling to improve wheel speed sensor quality can also be executed locally, e.g., by the MSD control units 430. This enables the MSD control units to obtain local estimates of vehicle SOG, allowing the MSD control units to perform local wheel slip estimation and control. In other words, an MSD control unit can perform slip control using locally available wheel slip data using a vehicle SOG determined based on a locally available IMU signal for a limited period of time. When the locally modelled error in the vehicle SOG becomes too large, the MSD control unit 430 can report a reduced capability back to the VMM function 460, and then temporarily place its wheel in a reduced slip condition or even in a free-rolling state. The VMM function 460, having received the updated capability message in good time before the wheel is placed in free-rolling state by the MSD control unit 430, is then able to compensate for the action performed locally by the MSD controller 430, e.g., by the MSD coordination function 530.

The MSD coordination function 530 can also be arranged to output data 560 indicative of a wheel slip set-point and/or a torque set-point of a wheel 410 on the heavy-duty vehicle 100 to the motion estimation function 510, i.e., a signal indicative of if a given wheel can be used to determine vehicle SOG or not. The motion estimation function 510 is then able to estimate the vehicle motion state s (in particular the vehicle SOG) in a more reliable manner, using the wheel slip indication data 560, since it now knows how the wheels will be slipping in the near future (when the MSD set-points are actuated upon by the actuators). The MSD coordination function 530 can for instance communicate the slip limits it has imposed on the different wheels, and the motion estimation function 510 can then determine which wheel speed sensor signals that it can use for reliably estimating vehicle SOG. For instance, the motion estimation function 510 can estimate the vehicle motion state s based on wheel speed for wheels where slip is low, and based on the IMU signal or signals otherwise. The motion estimation can also operate in a more proactive manner, avoiding transient error effects resulting from onset of wheel slippage.

The motion estimation function 510 bases the estimate of vehicle motion state s, and the estimate of vehicle SOG in particular, on a weighted combination of wheel speed sensor data and IMU data. As part of basing the weights on the SOG error of the wheel speed signal the weights of the weighted combination can be configured in dependence of the data 560 indicative of wheel slip set-point and/or torque set-point. This means that the motion estimation function accounts for an estimated accuracy of the different sensors, with increased accuracy and reliability as a consequence.

Particular advantages can be obtained if the wheel slip set-points of the wheels on the heavy-duty vehicle are reduced temporarily in a sequence, such that the slip is temporarily reduced for each wheel in the sequence for a short period of time. This provides an effect from the free-rolling of the wheels which is distributed over the vehicle, avoiding excessive yaw motion, pitch motion, and the like. The MSD coordination function 530 is optionally arranged to reduce respective wheel slip set-points of the one or more wheels 102, 410 of the heavy-duty vehicle 100 in a predetermined or random sequence, where each wheel in the sequence is placed in a low slip condition for a pre-determined and limited duration of time.

Figure 6:
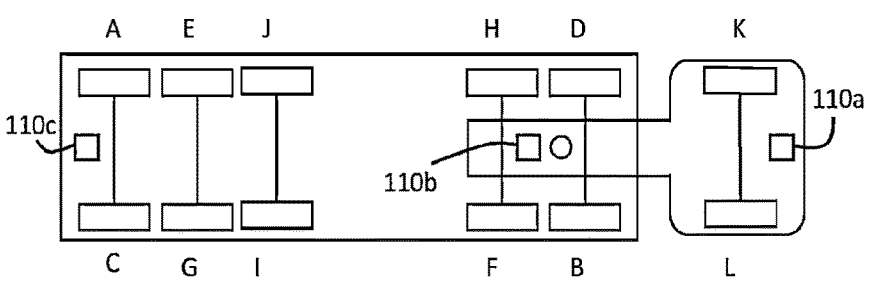
FIG. 6 illustrates an example heavy-duty vehicle.

With reference to FIG. 6, the sequence may, for instance, be selected to balance torque loss on the two sides of the vehicle, e.g., as {A, B, C, D, E, F, G, H, I, J}. Thus, the sequence may involve periodic application of wheel slip or torque constraints on the left and the right-hand side of the vehicle, i.e., first a wheel on the left-hand side of the vehicle is placed in a low wheel slip condition, and then a wheel on the right-hand side of the vehicle is placed in a low wheel slip condition, whereupon once more a wheel on the left-hand side is placed in low slip condition. This provides an opportunity for distributing the effects of placing one or more wheels in a low wheel slip condition. The wheel in low slip condition used for estimating vehicle speed can also be switched between two or more axles in sequence. The time period where each wheel is placed in low slip condition need not be very long, normally one second or less is sufficient to get an estimate of vehicle speed from the wheel speed sensor which is not significantly affected by wheel slip.

FIG. 6 also shows an example arrangement of IMUs 110*a*, 110*b*, 110*c*, i.e., a plurality of IMUs, where each IMU is mounted at a respective location on the vehicle 100. The different IMUs measure accelerations of their respective parts of the vehicle 100. Generally, when more than one IMU is available, it makes sense to base motion estimation of a given part of the vehicle primarily on the output from an IMU located close to the vehicle part. For instance, to determine vehicle SOG for wheels A, E, J, C, G or I, the IMU 110*c* is most suitable, while the IMU 110*b* is more suitable when vehicle SOG for wheels H, D, F or B is to be estimated. The IMU 110*a* is located at the front of the vehicle, close to the steered axle, and is therefore suitable for estimating vehicle SOG in vicinity of the steered front axle, e.g., during periods of large wheel slip at said front axle. Weighted combinations of the IMU signals can of course also be used with advantage, where the weights can, e.g., be based on the distance from the given IMU device to the wheel where vehicle SOG is needed to determine wheel slip. Generally, the vehicle 100 may comprise a plurality of IMUs, where each wheel on the vehicle is associated with one or more of the plurality of IMUs, and where the associated IMUs provide IMU signals which are used by the VMM function 460 to estimate vehicle SOG during periods of time when the wheel is associated with large wheel slip, i.e., a level of wheel slip above some predetermined threshold or failing to meet some other type of predetermined acceptance criterion.

Figure 7A:
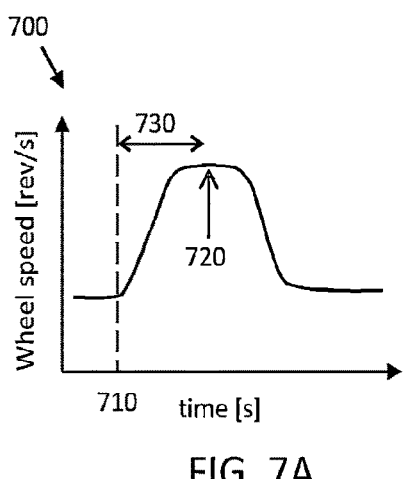
FIGS. 7A-B are graphs illustrating wheel speed signals.

According to other aspects, the motion estimation function 510 is configured to estimate the vehicle motion state s based on the wheel speed signal with a delay relative to the reduction in the wheel slip set-point. This delay allows transients to settle before the vehicle SOG is "sampled" using the wheel speed sensor. FIG. 7A shows an example 700 of such transient behavior in the wheel speed sensor signal output. At 710, negative torque is removed from the wheel, i.e., braking is suspended. This causes the wheel to accelerate up to a wheel speed close to the vehicle SOG, which happens around the time instant marked 720 after the delay 730. Thus, by allowing for a delay, effects of such transient behavior can be alleviated or even avoided entirely. A similar behavior will be observed if positive torque is removed from the wheel, in which case the wheel speed will decrease to more closely follow the actual vehicle SOG.

Figure 7B:
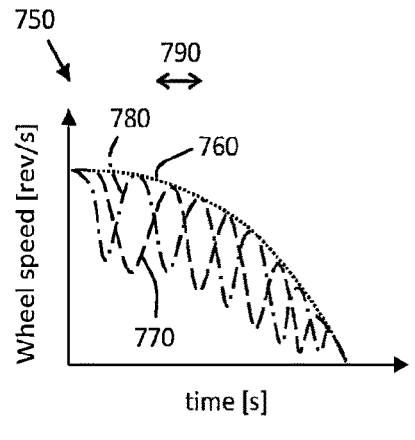

The motion estimation function 510 may also be configured to estimate the vehicle motion state s based on the wheel speed signal as an extreme point of the wheel speed signal (a maximum value in case of braking and a minimum value in case of acceleration) over a given time period. The rationale being that the maximum or minimum wheel speed signal is the closest to the vehicle SOG. FIG. 7B illustrates an example 750 where two wheel speed signals 770, 780 are used to estimate vehicle SOG. The true vehicle SOG is also plotted as the dotted line 760 for reference. It is noted that the wheel speed signals increase as torque is reduced up to a maximum value which is close to the true vehicle SOG. Each time a wheel speed maximum value is observed, the IMU integrator can be reset, thus maintaining accurate vehicle SOG information throughout the entire vehicle maneuver.

Figure 8:
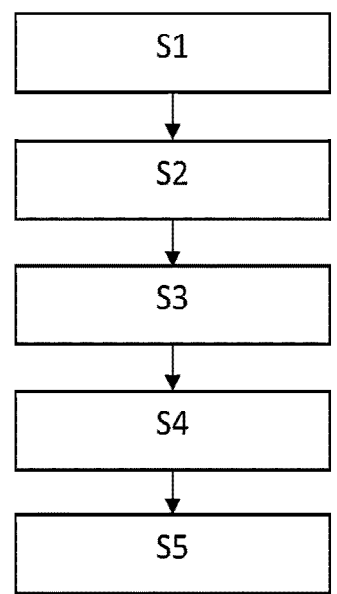
FIG. 8 is a flow chart illustrating methods.

FIG. 8 is a flow chart illustrating a method which summarizes some of the key concepts discussed above. There is illustrated a computer implemented method for estimating vehicle speed over ground $v_x$ of a heavy-duty vehicle 100, the method comprises configuring S1 at least one wheel speed sensor 106 to output a wheel speed signal 401 indicative of a rotation speed of a respective wheel 102, 410 on the vehicle 100, configuring S2 at least one inertial measurement unit, IMU, 110 to output an IMU signal 402 indicative of an acceleration of the vehicle 100, estimating S3 a vehicle motion state s comprising vehicle speed over ground, SOG, $v_x$ based on the at least one wheel speed signal 401 and on the at least one IMU signal 402, estimating S4 a respective SOG error associated with the wheel speed signal 401 as an increasing function of an applied torque to the wheel 102, 410, and a respective SOG error associated with the IMU signal 402 as an increasing function of a time duration elapsed after calibration of an integrator of the IMU signal, and estimating S5 the vehicle SOG $v_x$, based on a weighted combination of the at least one wheel speed signal 401 and the at least one IMU signal 402, where the weights of the weighted combination are determined based on the SOG error associated with the wheel speed signal and on the SOG error associated with the IMU signal. Thus, the method encompasses the method steps discussed above in connection to FIGS. 1-7. The different aspects are of course also applicable together with the method illustrated in FIG. 8.

Figure 9:
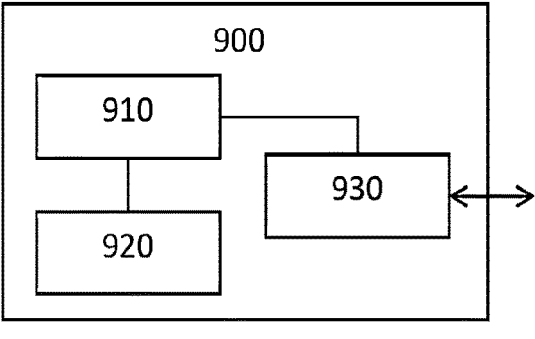
FIG. 9 schematically illustrates a control unit.

FIG. 9 schematically illustrates, in terms of a number of functional units, the components of a control unit 900 according to embodiments of the discussions herein, such as any of the MSD control units 430 or the VMM function 460. Processing circuitry 910 is provided using any combination of one or more of a suitable central processing unit CPU, multiprocessor, microcontroller, digital signal processor DSP, etc., capable of executing software instructions stored in a computer program product, e.g., in the form of a storage medium 930. The processing circuitry 910 may further be provided as at least one application specific integrated circuit ASIC, or field programmable gate array FPGA. Particularly, the processing circuitry 910 is configured to cause the control unit 900 to perform a set of operations, or steps, such as the methods discussed in connection to FIG. 8 and generally herein. For example, the storage medium 930 may store the set of operations, and the processing circuitry 910 may be configured to retrieve the set of operations from the storage medium 930 to cause the control unit 900 to perform the set of operations. The set of operations may be provided as a set of executable instructions. Thus, the processing circuitry 910 is thereby arranged to execute methods as herein disclosed.

The storage medium 930 may also comprise persistent storage, which, for example, can be any single one or combination of magnetic memory, optical memory, solid state memory or even remotely mounted memory.

The control unit 900 may further comprise an interface 920 for communications with at least one external device. As such the interface 920 may comprise one or more transmitters and receivers, comprising analogue and digital components and a suitable number of ports for wireline or wireless communication.

The processing circuitry 910 controls the general operation of the control unit 900, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

Figure 10:
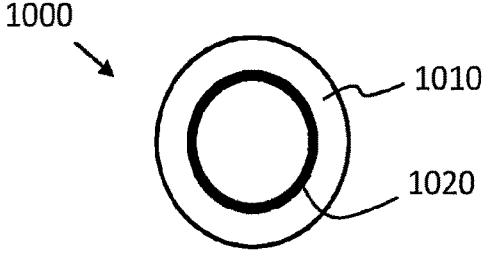
FIG. 10 shows an example computer program product.

FIG. 10 illustrates a computer readable medium 1010 carrying a computer program comprising program code means 1020 for performing the methods illustrated in FIG. 8 and the techniques discussed herein, when said program product is run on a computer. The computer readable medium and the code means may together form a computer program product 1000.

The invention claimed is:

1. A vehicle motion management, VMM, system for a heavy-duty vehicle, the system comprising:

at least one wheel speed sensor configured to output a wheel speed signal indicative of a rotation speed of a respective wheel on the vehicle, at least one inertial measurement unit, IMU, configured to output an IMU signal indicative of an acceleration of the vehicle, a motion estimation function configured to estimate a vehicle motion state(s) comprising vehicle speed over ground, SOG, based on the at least one wheel speed signal and on the at least one IMU signal, where the motion estimation function is arranged to estimate a respective SOG error associated with the wheel speed signal as an increasing function of an applied torque to the wheel, and a respective SOG error associated with the IMU signal as an increasing function of a time duration elapsed since last calibration of an integrator of the IMU signal, where the motion estimation function is configured to estimate the vehicle SOG, based on a weighted combination of the at least one wheel speed signal and the at least one IMU signal, where the weights of the weighted combination are determined based on the SOG error associated with the wheel speed signal and on the SOG error associated with the IMU signal.

2. The VMM system according to claim 1, where the SOG error associated with the wheel speed signal is a non-decreasing polynomial function of the applied torque to the wheel.

3. The VMM system according to claim 1- or 2, where the SOG error associated with the wheel speed signal is a function of road friction and/or a normal force of the wheel.

4. The VMM system according to claim 1, where the SOG error associated with the wheel speed signal is a function of a slip stiffness value of the wheel.

5. The VMM system according to claim 1, where the SOG error associated with the IMU signal is a function of a pre-determined bias value of the IMU.

6. The VMM system according to claim 1, where the SOG error associated with the IMU signal is a function of a pre-determined noise power characteristic of the IMU.

7. The VMM system according to claim 1, where the motion estimation function is arranged to calibrate the integrator of the IMU signal based on the wheel speed signal, on the SOG error associated with the wheel speed signal, and on an associated acceptance criterion.

8. The VMM system according to claim 1, further comprising an MSD coordination function configured to coordinate actuation of a plurality of MSDs of the heavy-duty vehicle in dependence of a vehicle motion request and the vehicle SOG, where at least one MSD is arranged to control the applied torque to the wheel.

9. The VMM system according to claim 8, where the MSD coordination function is arranged to output data indicative of a wheel slip set-point and/or a torque set-point of the at least one wheel to the motion estimation function, where the motion estimation function is arranged to estimate the respective SOG error associated with the wheel speed signal based on the data indicative of wheel slip set-point and/or torque set-point.

10. The VMM system according to claim 8, where the motion estimation function is arranged to output a free-rolling request to the MSD coordination function in case the smallest of the SOG error associated with the wheel speed signal and the SOG error associated with the IMU signal fails to meet an acceptance criterion, where the MSD coordination function is arranged to reduce a wheel slip set-point of one or more wheels of the heavy-duty vehicle in response to receiving the free-rolling request from the motion estimation function.

11. The VMM system according to claim 10, where the MSD coordination function is arranged to set a wheel slip request or torque request for one or more wheels of the heavy-duty vehicle to zero in response to receiving the free-rolling request.

12. The VMM system according to claim 10, where the MSD coordination function is configured to coordinate actuation of the plurality of MSDs of the heavy-duty vehicle based on the solution to a constrained optimization problem, where one or more constraints of the constrained optimization problem is arranged to be configured in dependence of if the free-rolling request has been received.

13. The VMM system according to claim 10, where the MSD coordination function is arranged to reduce respective wheel slip set-points of the one or more wheels of the heavy-duty vehicle in a sequence, where each wheel in the sequence is placed in a low slip condition for a pre-determined duration of time.

14. A heavy-duty vehicle comprising a VMM system according to claim 1.

15. A computer implemented method for estimating vehicle speed over ground, SOG, of a heavy-duty vehicle, the method comprising:

configuring at least one wheel speed sensor to output a wheel speed signal indicative of a rotation speed of a respective wheel on the vehicle, configuring at least one inertial measurement unit, IMU, to output an IMU signal indicative of an acceleration of the vehicle, estimating a vehicle motion state(s) comprising vehicle speed over ground, SOG, based on the at least one wheel speed signal and on the at least one IMU signal, estimating a respective SOG error associated with the wheel speed signal as an increasing function of an applied torque to the wheel, and a respective SOG error associated with the IMU signal as an increasing function of a time duration elapsed after calibration of an integrator of the IMU signal, and estimating the vehicle SOG, based on a weighted combination of the at least one wheel speed signal and the at least one IMU signal, where the weights of the weighted combination are determined based on the SOG error associated with the wheel speed signal and on the SOG error associated with the IMU signal.

\* \* \* \* \*